United States Patent [19]

Russell

[11] Patent Number: 4,854,353
[45] Date of Patent: Aug. 8, 1989

[54] BULK CONTAINER FILLING APPARATUS

[75] Inventor: Raymond L. Russell, Cedar Falls, Iowa

[73] Assignee: Container Corporation of America, Clayton, Mo.

[21] Appl. No.: 197,368

[22] Filed: Mar. 9, 1988

[51] Int. Cl.$^4$ .............................................. B65B 1/04
[52] U.S. Cl. ........................................ 141/74; 141/93; 141/83; 141/73; 141/263; 141/270; 141/284
[58] Field of Search ........................ 141/71, 72, 73, 74, 141/80, 83, 93, 250, 263, 269, 270, 284, 369, 370, 371, 372, 114, 78

[56] References Cited

U.S. PATENT DOCUMENTS

| | | | |
|---|---|---|---|
| 2,105,589 | 1/1938 | Eades | 141/93 |
| 3,184,044 | 5/1965 | Allen et al. | 141/78 X |
| 3,260,285 | 7/1966 | Vogt | 141/8 |
| 3,786,844 | 1/1974 | Smearsoll et al. | 141/8 |
| 3,788,368 | 1/1974 | Geng et al. | 141/83 X |
| 4,054,161 | 10/1977 | Atack | 141/93 |
| 4,182,383 | 1/1980 | Adomitis et al. | 141/83 X |
| 4,193,430 | 3/1980 | James, Jr. et al. | 141/72 X |
| 4,312,388 | 1/1982 | Hager et al. | 141/93 X |
| 4,782,865 | 11/1988 | Everman | 141/83 |

OTHER PUBLICATIONS

Heating and Ventilating's Detail Sheet, "Dust Control from Hoppers", pp. 9, 10, Jul. 1953.

*Primary Examiner*—Ernest G. Cusick
*Attorney, Agent, or Firm*—Richard W. Carpenter

[57] ABSTRACT

A vertically movable hood, for temporarily closing and sealing the open upper end of a bulk container as the container is being filled with particulate material through the hood from a dispensing spout, and a pneumatically actuated mechanism for moving the hood vertically a slight distance over the container between an open position and a closed position.

7 Claims, 3 Drawing Sheets

BULK CONTAINER FILLING APPARATUS

BACKGROUND OF THE INVENTION

1. Field of the Invention

This invention relates generally to filling arrangements for bulk shipping containers, and more particularly to apparatus for temporarily closing and sealing the upper end of an open top bulk container, as the container and contents are being vibrated and weighed while the container is being filled with a particulate material.

2. Description of Background Art

A background art search directed to the subject matter of this application and conducted in the United States Patent and Trademark Office disclosed the following U.S. Pat. Nos.: 4,096,894 4,312,388 4,512,379 4,652,199 4,698,951.

None of the prior art patents uncovered in the background search discloses bulk container filling apparatus that includes a vertically moveable hood arrangement for temporarily closing and sealing the upper end of an open top bulk container, as the container and contents are being vibrated and weighed while the container is being filled with a particulate material.

SUMMARY OF THE INVENTION

It is an object of the present invention to provide apparatus for filling an open top bulk shipping container with particulate material, which apparatus is capable of vibrating and weighing the container and contents during the filling operation to insure that the material is compacted within the container and that the container is filled with a predetermined quantity of material by weight.

A more specific object of the invention is the provision of apparatus of the type described that includes a vertically movable hood for temporarily closing and sealing the upper end of a bulk container as it is being filled.

These and other objects of the invention will be apparent from an examination of the following description and drawings:

Figure 1:
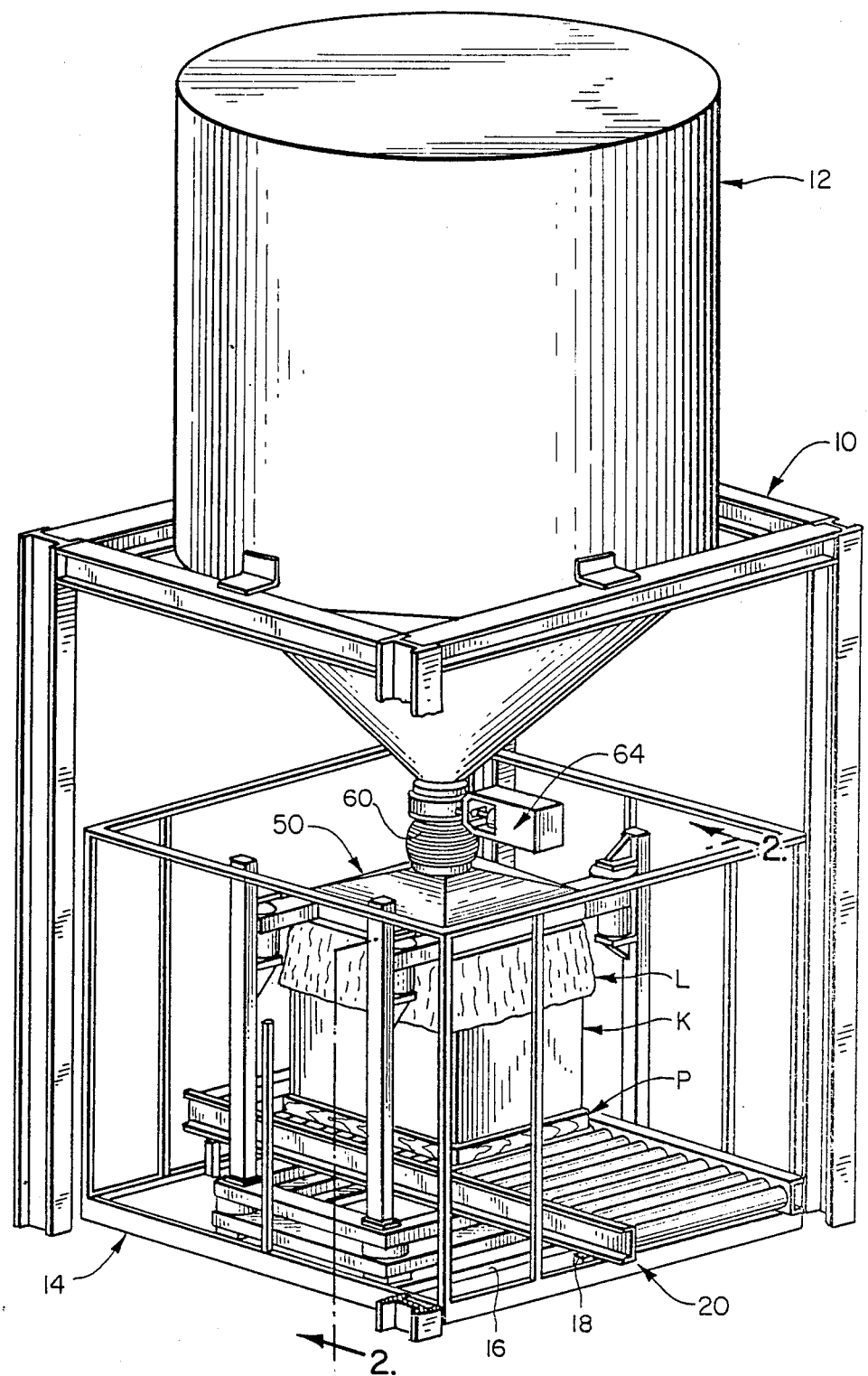
FIG. 1 is a fragmentary perspective view of a bulk container filling station that includes apparatus embodying features of the present invention.

It will be understood that, for purposes of clarity, certain elements may have been intentionally omitted from certain views where they are illustrated to better advantage in other views.

DESCRIPTION OF THE PREFERRED EMBODIMENT

An open top bulk container is usually prepared for filling with particulate material by placing a liner bag in the container and cuffing the the top of the bag over the upper end of the container. The container is then placed under a fill spout where particulate material is delivered into the container. This procedure is objectionable, because dust is generated and cross contamination between fill station occurs. Also, product spillage over the side walls of the container occurs, particularly when vibratory settling is utilized to compact the contents of the container.

An alternate technique for filling open top bulk containers involves securing the bag opening to the fill spout. This helps contain the dust generated within the bag and prevent spillage over the box side walls. This procedure is also objectionable, because it requires operator presence at the point of action. It is a time consuming procedure and highly dependent on operator skill in connecting the bag to the spout.

The arrangement of the present invention overcomes the objections of the usual filling methods while providing an alternate means to clamp a box for vibratory settling. The arrangement contemplates a moveable hood, which serves to close the top of the container as it is being filled, and which also serves to clamp the container and keep it in position on the conveyor while it is being filled, vibrated, and the contents are being weighed.

Referring now to the drawings for a better understanding of the invention, it will be seen that an open top bulk box or shipping container, indicated generally at K, is positioned on a pallet P, which in turn is on a roller type conveyor 20, The container is lined with a liner bag, indicated generally at L, the open end of which is cuffed over the upper end of the container prior to commencement of the filling operation.

Figure 2:
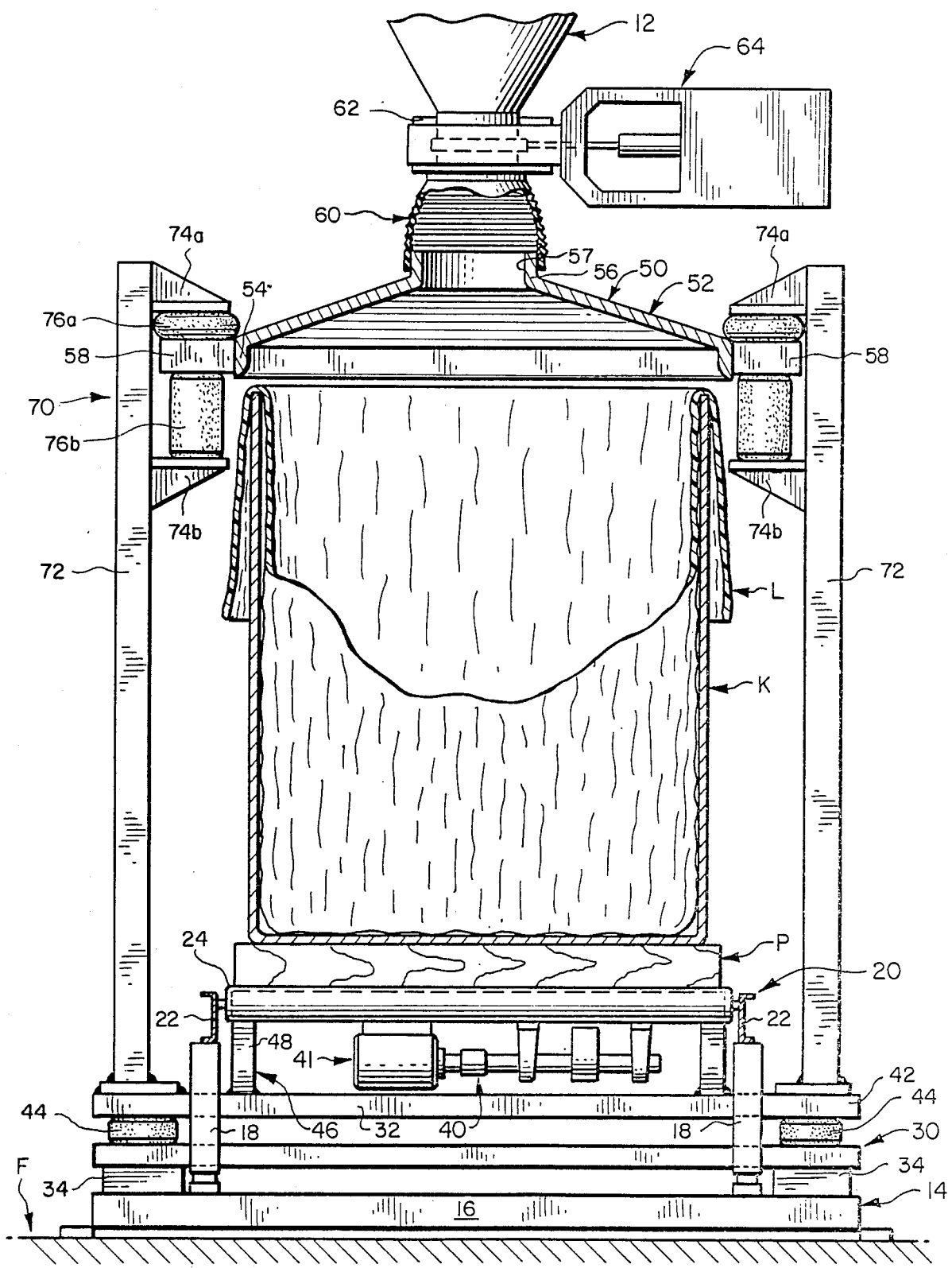
FIG. 2 is a transverse, vertical, sectional view taken on line 2—2 of FIG. 1, illustrating the filling apparatus with the moveable hood shown in the raised or open position.
Figure 3:
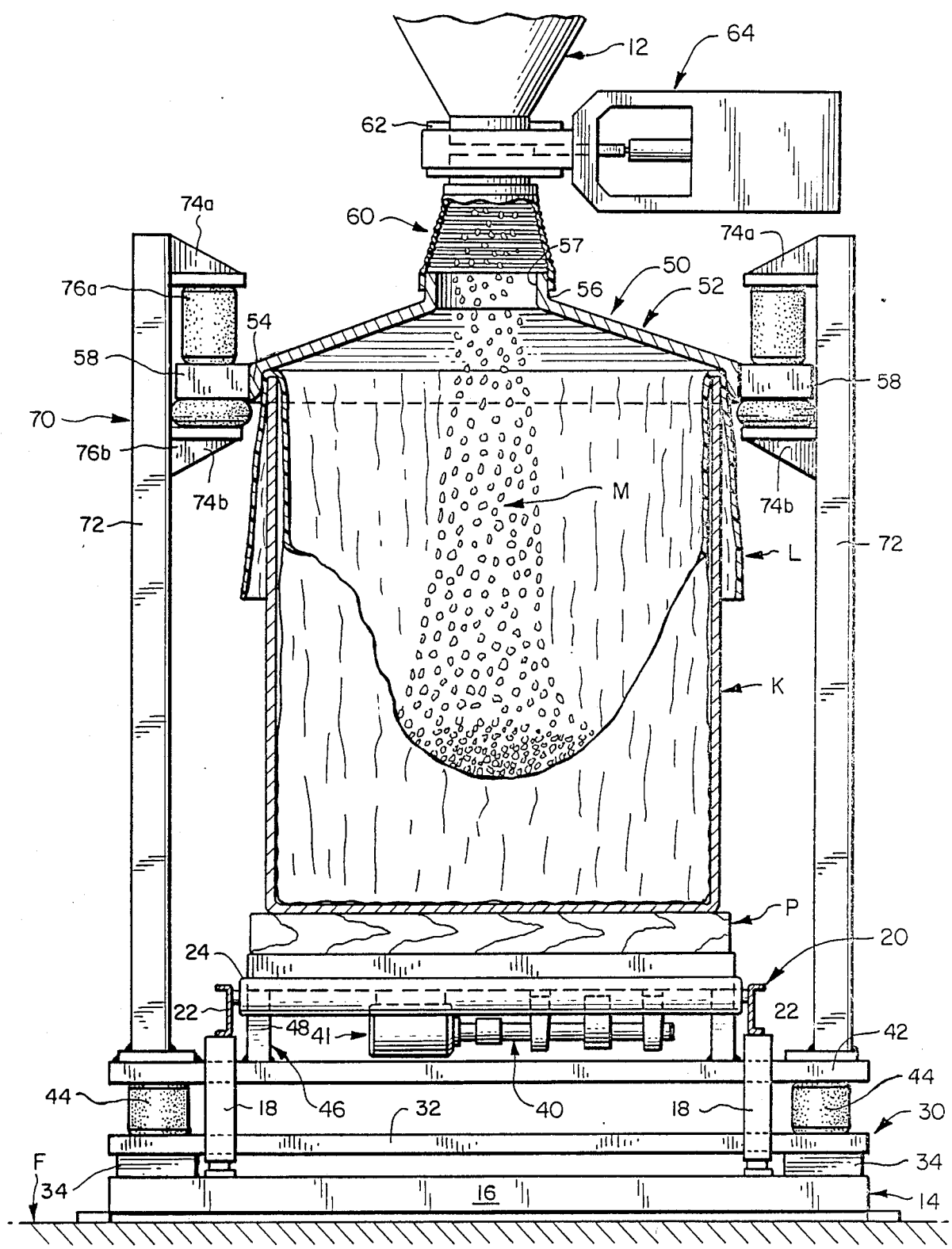
FIG. 3 is a view similar to FIG. 2, but with the hood shown in the lower or closed position.

As best seen in FIGS. 2 and 3, the filling apparatus of the invention is supported on a horizontal deck or floor surface F, and includes an upper frame or superstructure 10 on which is supported a hopper 12 containing a particulate material M to be deposited in the container.

Below the upper frame 10, is a lower frame structure or base, indicated generally at 14, which includes a pair of transversely extending horizontal members or beams 16 adapted to support a scale assembly 30 and vibrator assembly 40, as described later in the application. The lower frame 14 also includes a plurality of vertically extending members 18 adapted to support a conveyor assembly indicated generally at 20.

As best seen in FIG. 1, the conveyor assembly 20 is a conventional type roller conveyor which includes a pair of laterally spaced, longitudinally extending rails 22 between which extend a plurality of rollers 24.

The filling apparatus of the present invention is adapted primarily for filling an open top bulk container with a particulate material. In this type of filling operation, it is desirable to vibrate the container, so that its contents will settle and, at the same time, weigh the container and it contents during the filling operation to insure that the proper amount of material is placed into the container.

To accomplish this there is provided a weighing mechanism, or scale assembly, indicated generally at 30, which is supported on the horizontal member 16 of lower frame structure 14. The scale assembly includes a generally rectangular platform 32 that is supported at the corners by individual load cells or scales 34, which rest on the base members 16. Neither the scale assembly nor the vibrator assembly, referred to hereinafter, is described in great detail in this application, as both the weighing and vibrating assemblies are shown and described in greater detail in co-pending Application, Ser. No. 067,533 filed June 29, 1987 in the name of Wayne F. Everman, now U.S. Pat. No. 4,782,865, dated Nov. 8, 1988. If desired other types of weighing and vibrating mechanisms could also be employed.

The vibrating assembly, indicated generally at 40, includes a motor driven vibrating mechanism 41 mounted under a frame or deck 42. The deck 42 is supported at corners by pneumatic actuation devices, such as airbags 44, which in turn are supported by the platform 32 of the scale assembly 30.

The vibrator assembly 40 includes a grid 46 having a plurality of vertical projections 48 which extend upwardly for contact with the lower surface of the container or pallet on which it is supported. The projections 48 of the grid 46 are so spaced as to be able to extend between the rollers 24 of conveyor 20 when the deck 42 of the vibrator assembly is in the raised or vibrating position.

The essential feature of the present invention resides in the novel hood 50 and the hood moving assembly 70 illustrated in FIGS. 2 and 3 of the drawings.

The hood 50 includes a preferrably domed or pyramidal shaped upper wall or cover 52. If the container to be filled is round, the cover would be conical. Extending downwardly from the outer edge of the upper wall 52 is a peripheral vertical flange 54 adapted to enclose the upper end of the container when the hood is in a closed position, as best seen in FIG. 3.

The cover 52 is provided with an integral upwardly extending neck 56 having a central fill opening 57 extending therethrough. The neck of the hood may be connected by a flexible duct 60 to a fill spout 62 extending downwardly from hopper 12, which is supported by upper frame structure 10. In order to control the flow of material from the hopper, there may be provided a slide valve assembly 64, the details of which are not shown as it may be a conventional type slide valve.

Still referring to FIGS. 2 and 3, it will be seen that, projecting laterally outward from hood 50 beyond the lower flange 54, is a horizontal flange or rim 58, the purpose of which is to assist in raising and lowering the hood as hereinafter described. As best seen in FIG. 1, as well as illustrated in FIGS. 2 and 3, the hood 50 is mounted for limited vertical movement which is accomplished by a hood moving assembly indicated generally at 70.

The hood moving assembly 70 includes four vertically extending members or columns 72 which are supported by the vibrating frame or deck 42. Each of the columns 72 is provided with a pair of vertically spaced, inwardly extending, upper and lower ledges or abutmemts 74a and 74b, respectively. The horizontal flange or rim 58 of the hood 50 is adapted to be received at its corners between the related sets of upper and lower ledges.

Vertical movement of the hood is accomplished by sets of pneumatic actuating mechanisms also located at the corners of the hood. Each set includes a pair of upper and lower airbags 76a and 76b, respectively, which are positioned between the hood rim and the upper and lower ledges of each pair, respectively.

When it is desired to commence the filling operation, the upper airbags 76a are inflated and the lower airbags 76b are deflated, so the hood is moved from the upper or open position illustrated in FIG. 2, to the lower or closed position, illustrated in FIG. 3.

When the hood is in the lower or closed position, the vertical flange 54 of the hood clamps the liner against the upper end of the container to provide a relatively airtight connection therebetween and thereby prevent spillage of the material when the filling operation commences. Since the both the hood and the hood moving assembly are supported by the same frame structure that supports the vibrating mechanism, when the hood is lowered over the top of the container, it will maintain its position, relative to the overall frame structure, and will restrain the container from moving during the filling operation.

At the end of the filling operation, the lower airbags 76b are inflated and, the upper airbags 76a are deflated causing the hood assembly to move upward and permit the filled container to be moved along the conveyor out of the filling station and an empty container moved into the filling station.

Thus, it will be understood that the invention provides a relatively simple, yet positive means for retaining a container in position on a conveyor while it is being filled with particulate material and the contents vibrated to prevent spillage of the material during the filling operation.

What is claimed is:

1. Apparatus for vibrating, weighing, and filling an open top, bulk container with particulate material said apparatus comprising:
    (a) a base:
    (b) a weighing assembly supported by said base;
    (c) a vibrating assembly supported by the weighing assembly;
    (d) a fixed material dispensing spout;
    (e) a hood adopted to be positioned between a container and said spout and having a domed upper wall with a central filling opening connected by a non-rigid connection to said spout;
    (f) said hood being mounted for limited vertical movement and including:
        (i) a vertical flange, extending downwardly from said upper wall, and adapted to enclose an upper end of a container;
        (ii) a horizontal flange, extending laterally outward beyond said vertical flange;
    (g) means for moving said hood vertically between an upper open position and a lower closed position;
    (h) said moving means including at least one pair of pneumatic actuating devices positioned immediately above and below said hood horizontal flange for engagement therewith.

2. Apparatus according to claim 1, wherein said hood includes an integral, upwardly projecting neck, and wherein said filling opening is in said neck.

3. Apparatus according to claim 2, wherein said non-rigid connection extends between opening in said hood neck and said dispensing spout and is a flexible duct.

4. Apparatus according to claim 1, wherein said actuating devices include a pair of horizontally extending ledges disposed above and below said hood horizontal flange and a pair of inflatable bags interposed between said hood horizontal flange and said ledges.

5. Apparatus for temporarily closing and sealing the upper end of an open top container, as the container is being filled with particulate material, said apparatus comprising:
    (a) a frame structure;
    (b) a fixed material dispensing spout supported by the frame structure;
    (c) a hood supported by the frame structure and adapted to be positioned above a container and below said spout and having a domed upper wall with a central filling opening connected by a non-rigid connection to said spout;

(f) said hood being mounted for limited vertical movement relative to said frame structure and including:

(i) a vertical flange, extending downwardly from said upper wall, and adapted to enclose an upper end of a container;

(ii) a horizontal flange, extending laterally outward beyond said vertical flange;

(g) means mounted on said frame structure for moving said hood vertically between an upper open position and a lower closed position;

(h) said moving means including at least one pair of pneumatic actuating devices positioned immediately above and below said hood horizontal flange for engagement therewith.

6. Apparatus according to claim 5, wherein said actuating devices include a pair of horizontally extending ledges disposed above and below said hood horizontal flange and a pair of inflatable bags interposed between said hood horizontal flange and said ledges.

7. Apparatus for vibrating, weighing, and filling an open top, bulk container with particulate material, said apparatus comprising:

(a) a base;
(b) a weighing assembly supported by said base;
(c) a vibrating assembly supported by the weighing assembly;
(d) a fixed material dispensing spout;
(e) a hood adapted to be positioned between a container and said spout and having a filling opening connected to said spout;
(f) said hood being mounted for limited vertical movement and including:

(i) a vertical flange, extending downwardly, and adapted to enclose an upper end of a container;

(ii) a horizontal flange, extending laterally outward beyond said vertical flange;

(g) means for moving said hood vertically between an upper open position and a lower closed position, said means including at least one pair of pneumatic actuating devices;

(h) said actuating devices including a pair of horizontally extending ledges disposed above and below said hood horizontal flange and a pair of inflatable bags interposed between said hood horizontal flange and said ledges.

* * * * *